(12) United States Patent
Zhang

(10) Patent No.: US 9,594,496 B2
(45) Date of Patent: Mar. 14, 2017

(54) METHOD AND APPARATUS FOR PLAYING IM MESSAGE

(71) Applicant: TENCENT TECHNOLOGY (SHENZHEN) COMPANY LIMITED, Shenzhen (CN)

(72) Inventor: Lei Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/214,581

(22) Filed: Jul. 20, 2016

(65) Prior Publication Data

US 2016/0328140 A1 Nov. 10, 2016

Related U.S. Application Data

(63) Continuation of application No. PCT/CN2015/079784, filed on May 26, 2015.

(30) Foreign Application Priority Data

May 29, 2014 (CN) .......................... 2014 1 0233918

(51) Int. Cl.
*G06F 15/00* (2006.01)
*G06F 13/00* (2006.01)
(Continued)

(52) U.S. Cl.
CPC ........ *G06F 3/04847* (2013.01); *G06F 3/0481* (2013.01); *G06F 3/0482* (2013.01); *G06F 3/04883* (2013.01); *H04L 51/04* (2013.01)

(58) Field of Classification Search
CPC ..... G06F 3/04847; G06F 3/0482; H04L 51/04
(Continued)

(56) References Cited

U.S. PATENT DOCUMENTS

2008/0299999 A1* 12/2008 Lockhart ............... G06Q 10/109
455/466
2012/0317499 A1* 12/2012 Shen ...................... G06Q 10/107
715/752
2013/0275899 A1* 10/2013 Schubert ............... G06F 3/0481
715/765

FOREIGN PATENT DOCUMENTS

CN 101047520 A 10/2007
CN 101360278 A 2/2009
(Continued)

OTHER PUBLICATIONS

The World Intellectual Property Organization (WIPO) International Search Report for PCT/CN2015/079784 Aug. 12, 2015 p. 1-3.

*Primary Examiner* — Kevin Nguyen
(74) *Attorney, Agent, or Firm* — Anova Law Group, PLLC

(57) ABSTRACT

A method for playing an instant messaging (IM) message includes: displaying a received IM message in a dialog window of an IM client; selecting multiple target IM messages according to an indication of a touch control operation when the touch control operation used for merging IM messages of a preset type is detected; merging the selected multiple target IM messages into a message group and displaying the message group in the dialog window; continuously playing all IM messages in the message group when a touch control operation used for playing the IM messages in the message group is detected. In addition, the present disclosure further provides an apparatus for playing an IM message. By using the foregoing method and apparatus, the IM messages can be quickly played, and the efficiency of managing the IM messages can be improved.

19 Claims, 9 Drawing Sheets

(51) Int. Cl.
  *G06F 3/0484* (2013.01)
  *H04L 12/58* (2006.01)
  *G06F 3/0481* (2013.01)
  *G06F 3/0482* (2013.01)
  *G06F 3/0488* (2013.01)

(58) Field of Classification Search
  USPC ........ 715/752, 765, 716, 753, 763, 851, 740
  See application file for complete search history.

(56) References Cited

FOREIGN PATENT DOCUMENTS

| | | |
|---|---|---|
| CN | 101917353 A | 12/2010 |
| CN | 103051520 A | 4/2013 |

\* cited by examiner

METHOD AND APPARATUS FOR PLAYING IM MESSAGE

CROSS-REFERENCES TO RELATED APPLICATIONS

This application is a continuation application of PCT Patent Application No. PCT/CN2015/079784, filed on May 26, 2015, which claims priority to Chinese Patent Application No. 201410233918.0, entitled "METHOD AND APPARATUS FOR PLAYING IM MESSAGE" filed on May 29, 2014, the entire contents of both of which are incorporated herein by reference.

FIELD OF THE TECHNOLOGY

Specific embodiments of the present invention relate to the field of communications technologies, and in particular, to a method and an apparatus for playing an instant messaging (IM) message.

BACKGROUND OF THE DISCLOSURE

With the development of the Internet and terminal device technologies, IM programs running based on various intelligent terminal device platforms are increasingly applied in social intercourse by people. These IM programs support messages in forms of free voices, videos, images, or words that are quickly sent via a network, and make social activities of people more abundant and convenient.

Currently, because voice messages do not need to be manually input, one user only needs to press a recording key in a dialogue interface and speak what the user wants to send to the other user into a microphone, and the IM programs may send recorded voice content as voice messages to the other user, which is especially suitable for a scenario in which it is inconvenient to input messages manually by using keys. After receiving the voice messages, the other user may play the voice messages by clicking the voice messages, so as to read the voice messages.

However, in the foregoing technology, only unread voice messages may be automatically and continuously played, and voice messages that need to be played cannot be selected. Besides, read voice messages cannot be continuously played, and the voice messages can be repeatedly played only by means of clicking the voice messages one by one.

SUMMARY

In view of the above, it is necessary to provide a method and an apparatus for playing an IM message, which can be used to automatically play IM messages of a preset type, and select IM messages that need to be played, so as to improve playback degree of freedom and the efficiency of managing the IM messages.

A method for playing an IM message includes: displaying a received IM message in a dialog window of an IM client; detecting whether there is a touch control operation of merging IM messages of a preset type; selecting multiple IM messages from the dialog window as target IM messages according to an indication of the touch control operation if there is the touch control operation of merging IM messages of the preset type; merging the multiple target IM messages into a message group; displaying the message group in the dialog window; receiving a touch control operation used for playing the IM messages in the message group; and playing all IM messages in the message group.

An apparatus for playing an IM message includes: one or more processors; a memory; and one or more program units stored in the memory and executed by the one or more processors. The one or more program units includes: a display unit, configured to display a received IM message in a dialog window of an IM client; a selection unit, configured to detect whether there is a touch control operation of merging IM messages of a preset type, and select multiple IM messages from the dialog window as target IM messages according to an indication of the touch control operation if there is the touch control operation of merging IM messages of the preset type; a merging unit, configured to merge the multiple target IM messages into a message group, the display unit being further configured to display the message group merged by the merging unit in the dialog window; and a playback unit, configured to receive a touch control operation used for playing the IM messages in the message group, and play all IM messages in the message group.

A non-transitory computer readable storage medium having stored therein one or more instructions, which, when executed by a terminal device, cause the terminal device to: display a received IM message in a dialog window of an IM client; detect whether there is a touch control operation of merging IM messages of a preset type; select multiple IM messages from the dialog window as target IM messages according to an indication of the touch control operation if there is the touch control operation of merging IM messages of the preset type; merge the multiple target IM messages into a message group; display the message group in the dialog window; receive a touch control operation used for playing the IM messages in the message group; and play all IM messages in the message group.

By using the method and the apparatus for playing an IM message of the present disclosure, multiple target IM messages that satisfy a preset type are selected according to an indication of a touch control operation of a user and merged into a message group; and all IM messages in the message group are continuously played according to the indication of the user, so that the IM messages can be quickly played, and the efficiency of managing the IM messages can be improved.

To make the foregoing and other objectives, features, and advantages of the present disclosure easier to understand, a detailed description is made below by using listed preferred embodiments with reference to the accompanying drawings.

Other aspects of the present disclosure can be understood by those skilled in the art in light of the description, the claims, and the drawings of the present disclosure.

BRIEF DESCRIPTION OF THE DRAWINGS

The aforementioned features and advantages of the disclosed embodiments as well as additional features and advantages thereof will be more clearly understood hereinafter as a result of a detailed description of preferred embodiments when taken in conjunction with the drawings.

The following briefly describes the accompanying drawings included for describing the embodiments or the prior art. The accompanying drawings in the following descriptions merely show some embodiments, and persons of ordinary skill in the art can derive other drawings from these accompanying drawings without creative efforts.

DESCRIPTION OF EMBODIMENTS

To further explain the technical means used in the present disclosure for achieving the intended objectives and the effects thereof, the following describes in detail specific implementation manners, structures, features, and effects of the present disclosure with reference to the accompanying drawings and preferred embodiments.

Figure 1:
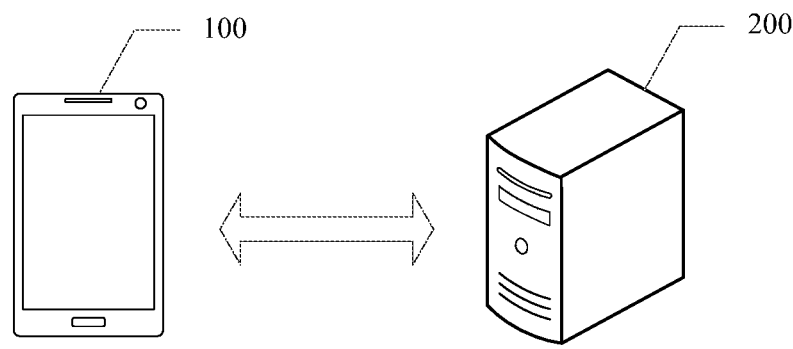
FIG. 1 is a schematic diagram of a running environment of a method for playing an IM message provided in an embodiment of the present invention.

Referring to FIG. 1, FIG. 1 is a running scenario diagram of a method for playing an IM message provided in an embodiment of the present invention. In the figure, a terminal device 100 is connected to a sever 200 via a network. The terminal device 100 may be a mobile device, or a portable device such as a mobile phone, a palmtop/tablet computer, or a mobile computer.

The terminal device 100 acquires IM messages from the sever 200, and displays the received IM messages in a dialog window of an IM client. IM messages include voice messages, video messages, word messages, image messages, and the like.

Multiple target IM messages are selected according to an indication of a touch control operation when the touch control operation used for merging IM messages of a preset type is detected. The IM messages of the preset type may include unread (i.e., un-played) and read (i.e., played) IM voice messages, and/or unread and read IM video messages. The IM messages of the preset type may also only include the read IM voice messages and/or the read IM video messages. IM messages of another type are filtered out if the multiple target IM messages selected according to the indication of the touch control operation include the IM messages of the another type that do not belong to the IM messages of the preset type, so that the multiple target IM messages only include IM messages that belong to the preset type.

The touch control operation may be a touch control gesture of pinching by using two fingers, which is a touch control gesture of a two-finger pinch for short. Specifically, when two fingers of a user touch the dialog window simultaneously, the two fingers have selected a range of IM messages that are to be merged into a message group, and all IM messages that belong to the preset type and are between IM messages corresponding to the two fingers are the IM messages that are to be merged into the message group by the user. Further, the gesture of the pinch triggers merging of the selected IM messages. An action of touching by using two fingers may be that the two fingers simultaneously touch the IM messages that are to be merged in the dialog window, and may also be that the two fingers successively touch the IM messages that are to be merged. Specific manners of determining IM messages that are between the two fingers may be: establishing a coordinate system in the dialog window when the touch control gesture of the two-finger pinch performed by the user in the dialog window of a touch screen is detected, a horizontal direction being an X axis, and a vertical direction being a Y axis; acquiring coordinate values of two fingers on the coordinate system when the two fingers touch and control the dialog window, and acquiring coordinate values of IM messages of various preset types, the coordinate values of the two fingers on the coordinate system including coordinate values on the X axis and coordinate values on the Y axis; and selecting IM messages of all preset types whose coordinate values on the Y axis are located between the coordinate values on the Y axis of the two fingers as the target IM messages.

Specific manners of determining IM messages that are between the two fingers may also be: acquiring receiving time of two IM messages that are touched when the two fingers touch and control the dialog window, and acquiring receiving time of IM messages of various preset types; and selecting IM messages of all preset types whose receiving time is between the receiving time of the two IM messages as the target IM messages.

Further, an avatar of a target IM message in a preset location is selected from the multiple target IM messages as an avatar of the message group. For example, an avatar of a target IM message in the first location is selected from multiple target IM messages as the avatar of the message group.

Further, a dialog box may be set in a preset location of the dialog window, and an annotation box may be set in a location that is in a preset distance away from the message group. For example, the preset distance may be four characters away from a right side of a display location of the message group (i.e., at the rear of the display location of the message group). Annotation information of the message group input by a user is received and displayed in the annotation box. For example, after the multiple target IM messages are merged into the message group; annotation information "message group" of the message group input by a user is received; and words "message group" are displayed in the annotation box of the message group.

All IM messages in the message group are continuously played when a touch control operation used for playing the IM messages in the message group is detected. The touch control operation may be custom settings, for example, may be a click operation or a slide operation on the message group, including a tap operation, a double-tap operation, an upward slide operation, a downward slide operation, or the like. All the IM messages in the message group are continuously played. For example, the message group includes 6 WeChat voice messages, and the 6 WeChat voice messages are continuously played according to a chronological order in which the messages are received.

It may be understood that continuously playing all the IM messages in the message group may also be set as circularly and continuously playing all the IM messages in the message group till the messages are stopped playing according to user instructions.

The message group may also be released, and the multiple IM messages may be restored displaying in the dialog window. A short-cut menu of releasing the message group is popped up when a touch control operation input by a user and used for releasing the message group is detected and the touch control operation is a preset touch control operation. The preset touch control operation used for releasing the message group may specifically be a touch and hold operation on the message group. When the touch and hold operation on the message group of the user is detected, the short-cut menu of releasing the message group is popped up. For example, a functional menu may be popped up, and the message group is selected to be released in the functional menu; and a dialog box may also be popped up to query whether to release the message group. A release instruction input by the user into the short-cut menu is received; the message group is released; and the multiple target IM messages are restored displaying in the dialog window. Specifically, the instruction for releasing the message group and selected by the user in the functional menu is received, or the instruction for releasing the message group and confirmed by the user is received; the message group is released; and the multiple target IM messages are restored displaying in the dialog window.

A user A and a user B perform IM by using the IM client running on the terminal device 100. The server 200 is connected to the terminal device 100 via a network, receives IM messages sent by the user A to the user B by using the IM client, and forwards the IM messages to an IM client of the user B, so that the user B may receive and process the IM messages by logging in to the IM client. Afterwards, the server 200 receives IM messages sent by the user B to the user A, and forwards the IM messages to an IM client of the user A, so that the user A may receive and process the IM messages by logging in to the IM client.

Figure 2:
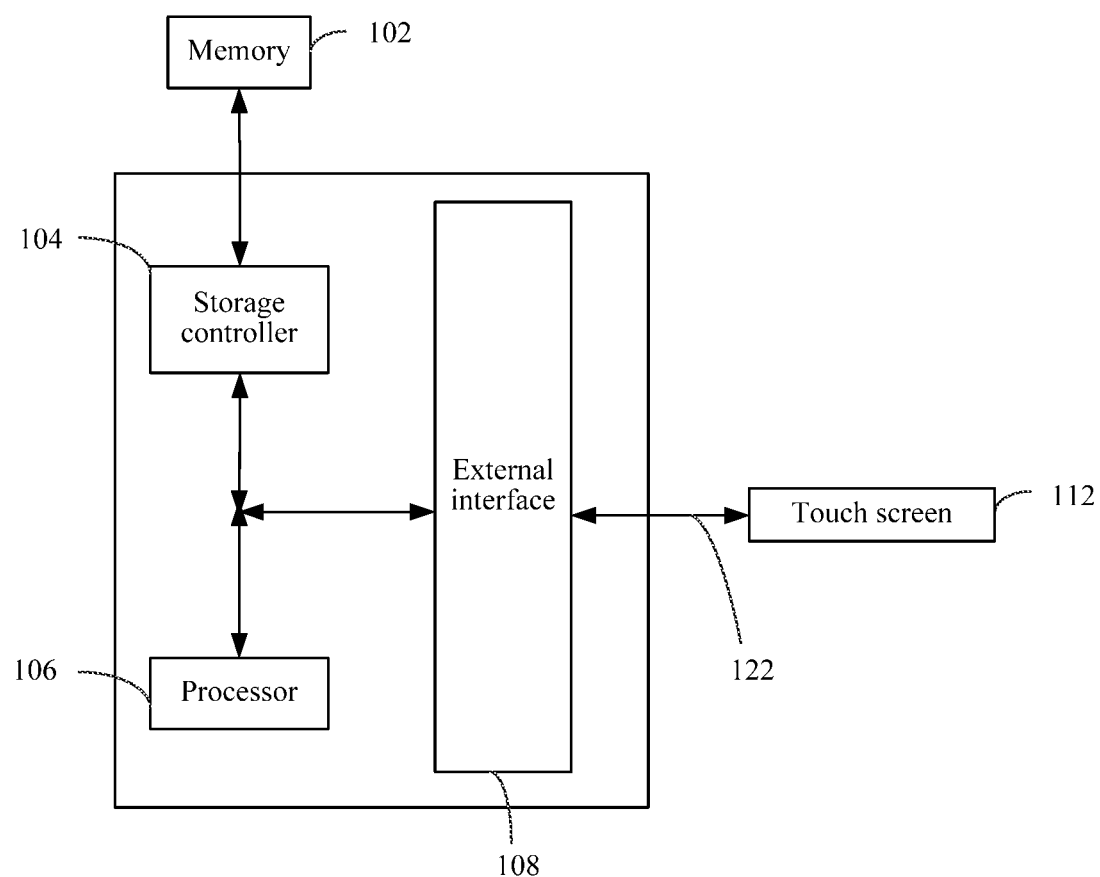
FIG. 2 is a structural block diagram of a terminal device.

FIG. 2 is a structural block diagram of a terminal device. The terminal device includes all terminal devices having a touch screen, such as a smart phone, a palmtop computer, and a tablet computer. As shown in FIG. 2, the terminal device 100 includes a memory 102, a memory controller 104, one or more processors 106 (only one processor is shown in the figure), an external interface 108, a radio frequency module 110, and a display screen 112. The display screen 112 may be a touch screen 112. These components communicate with each other by means of one or more communications buses/signal lines 122.

It may be understood that a structure shown in FIG. 2 is merely exemplary and does not constitute any limitation to a structure of the terminal device 100. For example, the terminal device 100 may also include more or fewer components than those shown in FIG. 2, or have a configuration different from that shown in FIG. 2. The components shown in FIG. 2 may be implemented by using hardware, software, or a combination thereof.

The memory 102 may be configured to a store a software program and module, such as a program instruction/module corresponding to a method and an apparatus for inputting characters in the terminal device. The processor 106 executes various functional applications and data processing by running the software program and module stored in the memory 102, thereby implementing the foregoing method for playing an IM message.

The memory 102 may include a high-speed random memory, and may also include a nonvolatile memory such as one or more magnetic storage apparatuses, a flash memory, or another nonvolatile solid-state memory. In some embodiments, the memory 102 may further include memories remotely disposed relative to the processor 106, and these remote memories may be connected to the terminal device 100 via a network. Examples of the network include, but not limited to, the Internet, an intranet, a local area network, a mobile communications network, or a combination thereof. The processor 106 and other possible components may access the memory 102 under the control of the memory controller 104.

The external interface 108 couples various input/output apparatuses to a CPU and the memory 102. The processor 106 runs various types of software inside the memory 102 to instruct the terminal device 100 to perform various functions and data processing.

In some embodiments, the external interface 108, the processor 106, and the memory controller 104 may be implemented in a single chip. In some other embodiments, the external interface 108, the processor 106, and the memory controller 104 may be separately implemented by using an independent chip.

The radio frequency module 110 is configured to receive and send an electromagnetic wave, and implement mutual conversion between the electromagnetic wave and an electric signal, so as to communicate with a communications network or another device. The radio frequency module 110 may include various existing circuit elements for performing these functions, such as an antenna, a radio frequency transceiver, a digital signal processor, a cipher/decipher chip, a subscriber identity module (SIM) card, and a memory. The radio frequency module 110 may communicate with various networks such as the Internet, an intranet and a wireless network, or communicate with other devices through a wireless network. The wireless network may include a cellular telephone network, a wireless local area network, or a metropolitan area network. The wireless network may use various communications standards, protocols and technologies, which include, but are not limited to, Global System for Mobile Communications (GSM), Enhanced Data GSM Environment (EDGE), Wideband Code Division Multiple Access (W-CDMA), Code Division Multiple Access (CDMA), Time Division Multiple Access (TDMA), Bluetooth, Wireless Fidelity (WiFi) (for example, US Institute of Electrical and Electronic Engineers IEEE 802.11a, IEEE 802.11b, IEEE802.11g and/or IEEE 802.11n), Voice over Internet Protocol (VoIP), Worldwide Interoperability for Microwave Access (Wi-Max), other protocols for email, instant messaging and short message service, and any other suitable communications protocols, and even may include some protocols that have not been developed.

The touch screen 112 provides an output and input interface between the terminal device 100 and the user. Specifically, the touch screen 112 displays a video output to the user, and content of the video output may include texts, images, videos, or any combination thereof. Some output results correspond to some user interface objects, such as a dialog window of an IM client. The touch screen 112 further receives an input of the user, such as tapping, sliding, two-finger pinching, or other gesture operations of the user, so that the user interface object responds to the input of the user. The technology for detecting the input of the user may be a resistive touch detection technology, a capacitive touch detection technology, or any other possible touch detection technologies. Specific examples of a display unit of the touch screen 112 include but are not limited to a liquid crystal display and a light-emitting polymer display.

Figure 3:
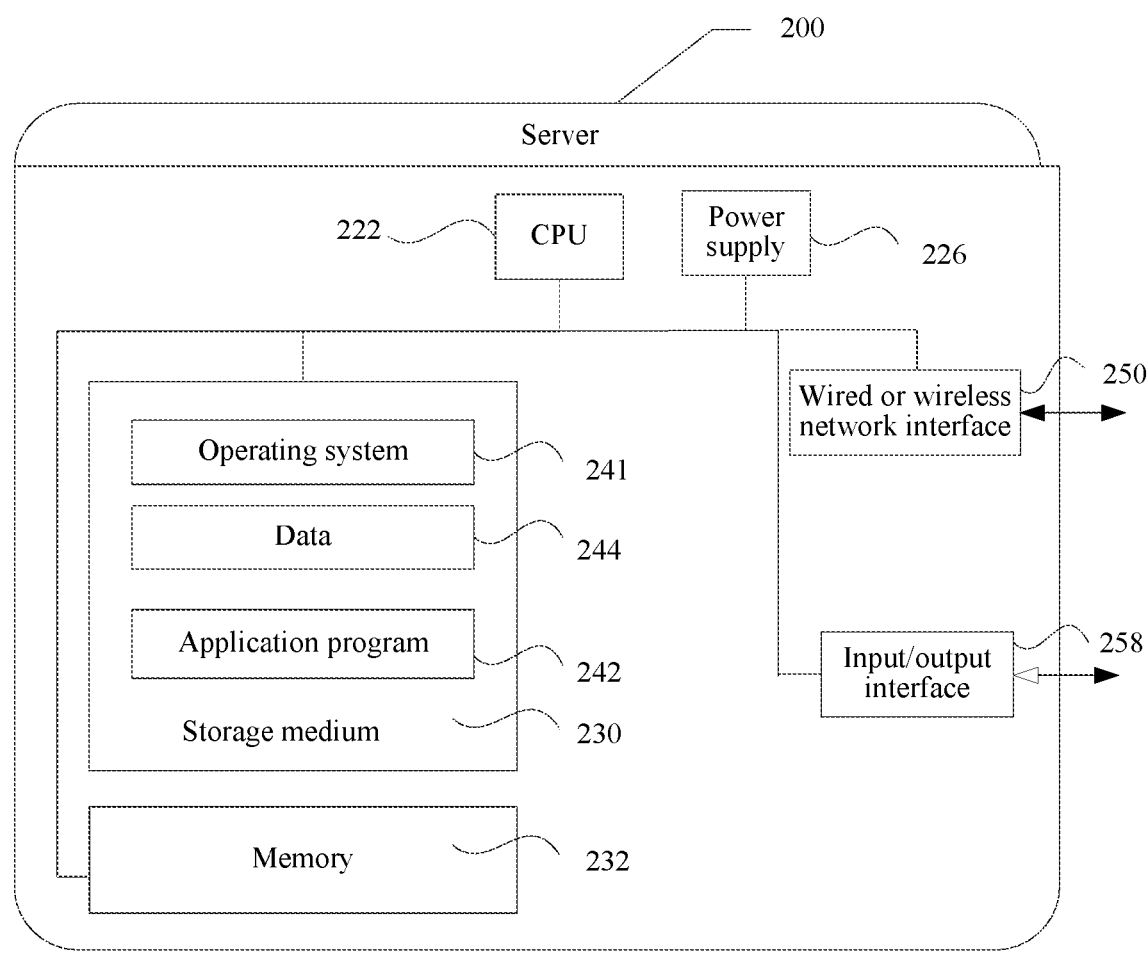
FIG. 3 is a structural block diagram of a server.

FIG. 3 shows a structural block diagram of a server. The server 200 may generate great differences owing to different configurations or performance, and may include one or more central processing units (CPUs) 222 (such as one or more processors), a memory 232, one or more storage media 230 (such as one or more mass storage devices) storing applications programs 242 or data 244. The memory 232 and the storage media 230 may be transient storage or persistent storage. The programs stored in the storage media 230 may include one or more modules (not shown in the figure), and each module may include a series of instructions on the server. Further, the CPUs 222 may be set to perform communication with the storage media 230, and execute the series of instructions in the storage media 230 on the server 200. The server 200 may further include one or more power supplies 226, one or more wired or wireless network interfaces 250, one or more input/output interfaces 258, and/or one or more operating systems 241 such as Windows Server™, Mac OS X™, Unix™, Linux™, or FreeBSD™. The steps executed by the server in the embodiment shown in FIG. 1 may be based on a server structure shown in FIG. 2.

Figure 4:
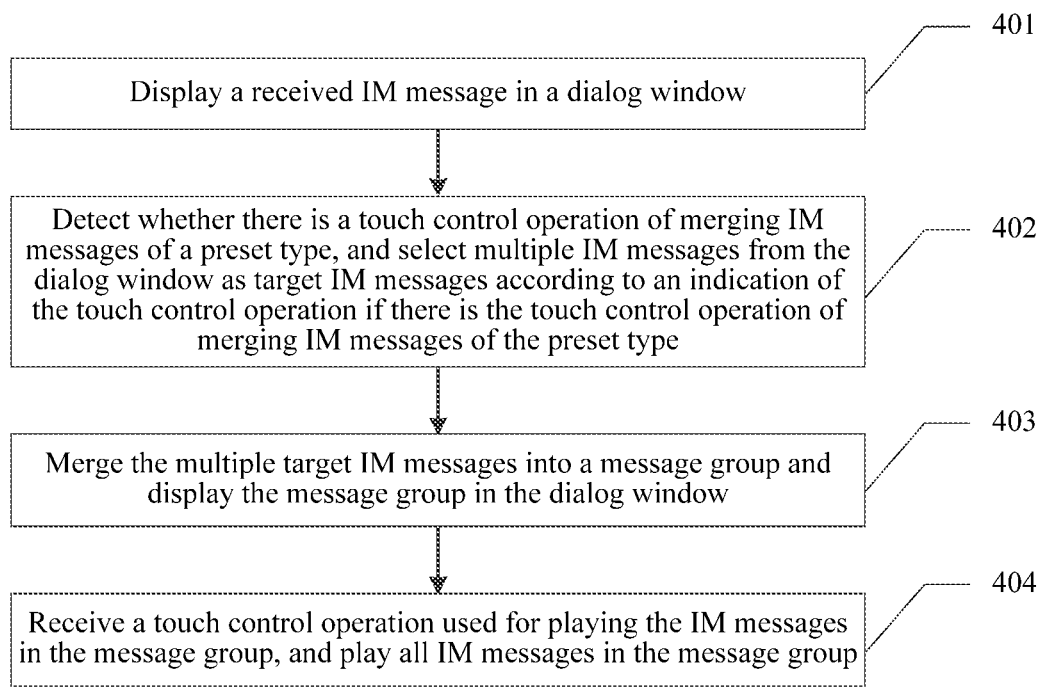
FIG. 4 is a flowchart of a method for playing an IM message provided in an embodiment of the present invention.

Referring to FIG. 4, the method for playing an IM message provided in FIG. 1 may be applied in the terminal device 100 shown in FIG. 2, including the following steps.

Step 401: Displaying a received IM message in a dialog window of an IM client.

IM refers to services that can send and receive Internet messages instantly, and the like. Functions of the IM become increasingly abundant, and gradually integrate multiple functions such as an e-mail, a blog, music, a television, a game, and search. Nowadays, more IM clients are applied in a terminal device, and services accessing Internet IM by means of the terminal device. Users may receive and send, by means of the terminal device, IM messages with another terminal device that is installed with a corresponding client.

The IM clients may include a WeChat client, a skype client, a TENCENT QQ client, a Yahoo Messenger client, or the like. For ease of description, the technical solutions are described by using a WeChat client as an example of the IM client in the embodiments of the present invention and by using WeChat messages as an example of the IM messages.

The terminal device 100 acquires IM messages from the server 200, and displays the received IM messages in a dialog window of the WeChat client. Message types of the IM messages include voice messages, video messages, word messages, image messages, and the like.

Step 402: Detecting whether there is a touch control operation of merging IM messages of a preset type, and selecting multiple IM messages from the dialog window as target IM messages according to an indication of the touch control operation if there is the touch control operation of merging IM messages of the preset type.

Multiple target IM messages are selected according to an indication of a touch control operation when the touch control operation used for merging IM messages of a preset type is detected. The IM messages of the preset type include IM voice messages and IM video messages. The IM messages of the preset type in this embodiment may include read and unread IM voice messages, and read and unread IM video messages. In order to improve the efficiencies of processing playing the IM voice messages, the IM messages of the preset type may only include the read IM voice messages and the read IM video messages.

Step 403: Merging the selected multiple target IM messages into a message group and display the message group in the dialog window. Specifically, the multiple target IM messages are integrated into a block message as a whole.

For example, the user selects 6 read WeChat voice messages according to the indication of the touch control operation, merges the 6 WeChat voice messages into one message group, and displays the message group in a WeChat dialog window. In this case, multiple target WeChat voice messages are not separately displayed in the dialog window again, and the user can only see one message group in the dialog window. In some embodiments, the one message group occupies a same area/space in the dialog window as a single message. For example, the one message group may be displayed at the original location of the first message in the message group in the dialog window. The display form of the one message group may be essentially the same as a single message.

Step 404: Receiving a touch control operation used for playing the IM messages in the message group, and playing all IM messages in the message group.

In this embodiment, the touch control operation may be custom settings, for example, may be a click operation or a slide operation on the message group, including a tap operation, a double-tap operation, an upward slide operation, a downward slide operation, or the like.

The playback may be continuous playback, i.e., continuously playing all IM messages in the message group. For example, the message group includes 6 WeChat voice messages, and the 6 WeChat voice messages are continuously played according to a chronological order in which the messages are received.

It may be understood that continuously playing all the IM messages in the message group may also be set as circularly and continuously playing all the IM messages in the message group till the messages are stopped playing according to user instructions (e.g., by tapping the message group again).

A playback order of the IM messages in the message group may be set in advance. For example, the IM messages are sorted according to receiving time of the IM messages, or an IM message that is touched by a certain finger when the user touches and controls the dialog window (e.g., before merging the IM messages of the preset type) is used as an initial message, and then the IM messages are played according to the receiving time.

According to the method for playing an IM message in this embodiment, multiple target IM messages that satisfy a preset type are selected according to an indication of a touch control operation of the user and merged into a message group; and all IM messages in the message group are continuously played according to the indication of the user, so that the IM messages can be quickly played, and the efficiency of managing the IM messages can be improved.

Figure 5:
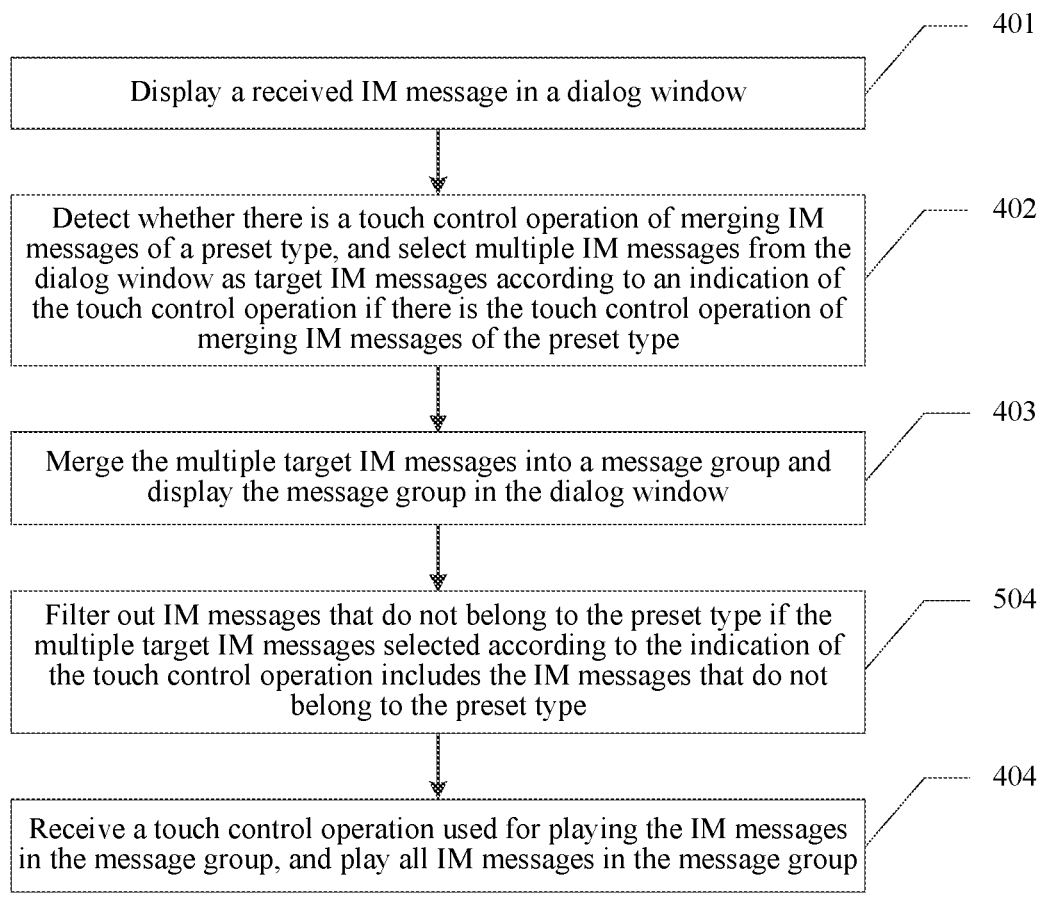
FIG. 5 is a flowchart of a method for playing an IM message provided in an embodiment of the present invention.

Referring to FIG. 5, a method for playing an IM message provided in an embodiment of the present invention may be applied in the terminal device 100 shown in FIG. 2, and the difference from the embodiment shown in FIG. 4 lies in that the method further includes the following.

Step 504: Filtering out IM messages that do not belong to the preset type, if the multiple target IM messages selected according to the indication of the touch control operation include the IM messages that do not belong to the preset type.

Filter results enable that the multiple target IM messages only include IM messages that belong to the preset type. That is, the IM messages that do not belong to the preset type, such as text messages and image messages, are filtered out before being merged into the message group, which can accelerate the efficiency of playing the message group. In some embodiments, the one or more IM messages that do not belong to the preset type may be filtered out when merging the target messages of the preset type. For example, the one or more IM messages that do not belong to the preset type may be displayed underneath or above the message group in the dialog window in a chronological order.

It may be understood that the present technical solution also includes that the IM messages that do not belong to the preset type are filtered out only when the IM messages in the message group are played. That is, the IM messages that do not belong to the preset type are not filtered out when being merged into the message group. For example, the one or more IM messages that do not belong to the preset type may be integrated into the message group and hidden from the dialog window. In this way, the efficiency of merging the message group may be sped up.

Figure 6:
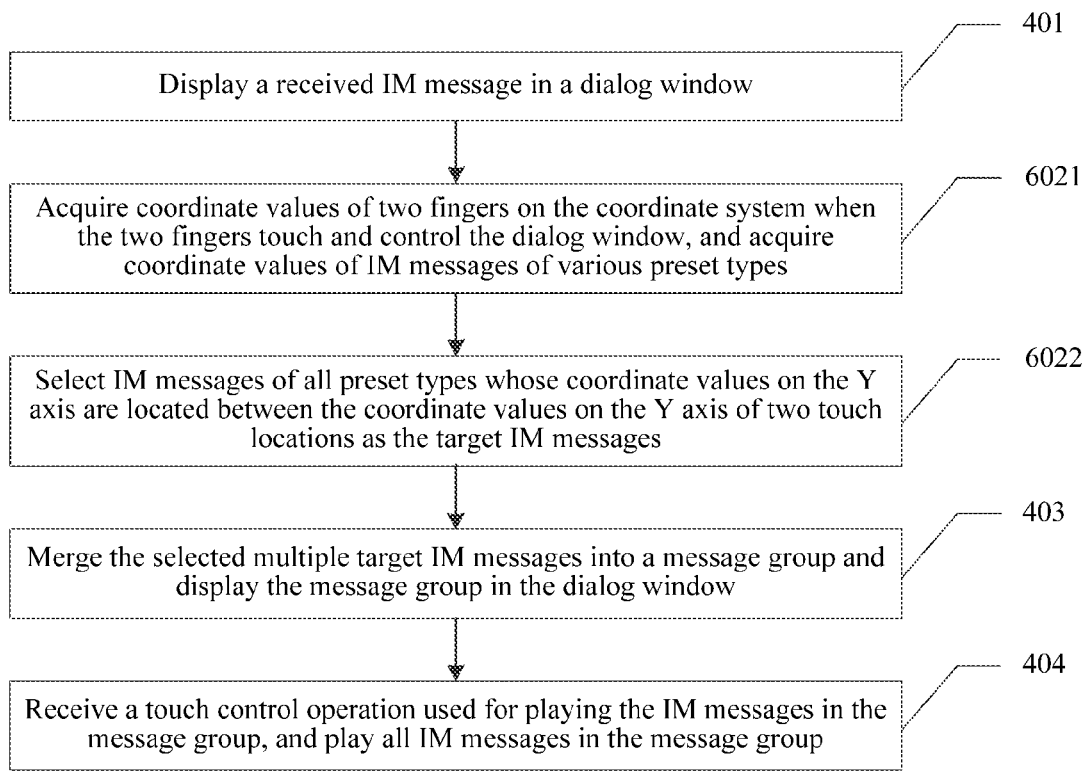
FIG. 6 is a flowchart of a method for playing an IM message provided in an embodiment of the present invention.

Referring to FIG. 6, a method for playing an IM message provided in an embodiment of the present invention may be applied in the terminal device 100 shown in FIG. 2, which is similar to the embodiment shown in FIG. 4, and the differences lie in that the touch control operation is a touch control gesture of a two-finger pinch specifically, and the selecting multiple target IM messages according to an indication of a touch control operation when the touch control operation used for merging IM messages of a preset type is detected in step 402 may further include the following steps.

Step 6021: Establishing a coordinate system in the dialog window when the touch control gesture of the two-finger pinch used for merging IM messages of a preset type is detected, a horizontal direction being an X axis, and a vertical direction being a Y axis; and acquiring coordinate values of two fingers on the coordinate system when the two fingers touch and control the dialog window, and acquiring coordinate values of IM messages of the preset type, the coordinate values of the two fingers on the coordinate system including coordinate values on the X axis and coordinate values on the Y axis.

Step 6021: Selecting IM messages of the preset type whose coordinate values on the Y axis are located between the coordinate values on the Y axis of the two fingers as the target IM messages.

Figure 7:
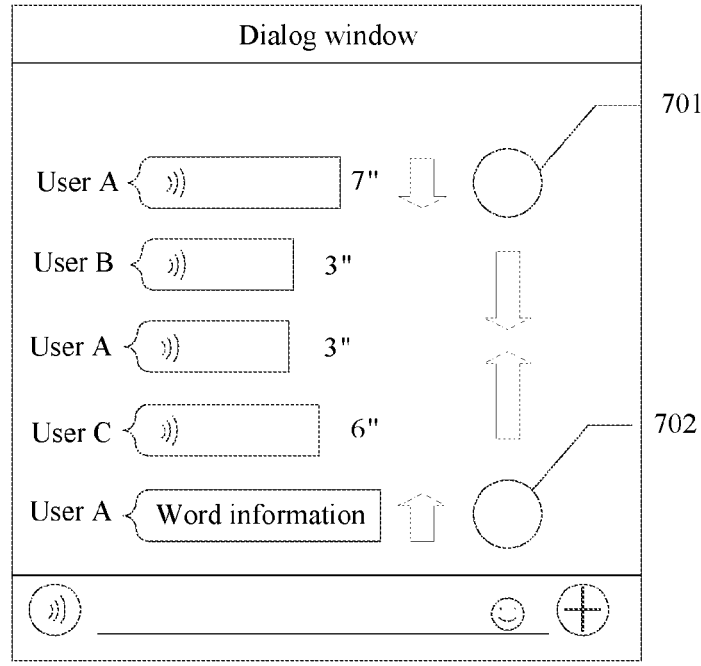
FIG. 7 is a schematic operational diagram of a user merging IM messages by means of a touch control operation.

As shown in FIG. 7, a touch control operation of merging IM messages of a preset type in this embodiment is a touch control gesture of a two-finger pinch of a user, and all IM messages that belong to the preset type and are between IM messages corresponding to the two fingers are the IM messages that are to be merged into the message group by the user. When two fingers of the user touch the dialog window simultaneously, the two fingers have selected a range of IM messages that are to be merged into a message group, and the gesture of the pinch triggers merging of the selected IM messages. 701 and 702 in FIG. 7 separately represent locations, on a screen, that are touched by the two fingers of the user. Arrows between 701 and 702 represent pinching directions of the two fingers. IM messages of a preset type (the type shown in the figure being IM voice messages) that are located between 701 and 702 in FIG. 7 are about to be merged into the message group.

It should be noted that the two fingers of the user may also successively and separately touch the IM messages in the dialog window. That is, an initial or end location of the IM messages that are to be merged is selected by one finger first; and then an initial or end location of IM messages that are to be merged is selected by the other finger. The range of the IM messages that are to be merged into the message group is selected by means of successive touches of the two fingers. For example, acquired coordinate values on the Y axis of two touch locations are separately 1 and 8, and IM messages of all preset types whose coordinate values on the Y axis are located between 1 and 8 are all used as the target IM messages.

In some embodiments, the preset type may further include message group type. For example, the dialog window may display a first message group and multiple single voice messages. The first message group may be located above, below, or in between the multiple single voice messages. The user may perform a touch operation to merge the first message group and the multiple single voice messages. Accordingly, the first message group and the multiple single voice messages may be integrated into a second message group according to their chronological order. Further, when the terminal device receives a touch instruction to play the second message group displayed in the dialog window, all messages in the second message group (including messages in the first message group and the multiple single voice messages) are played.

Figure 8:
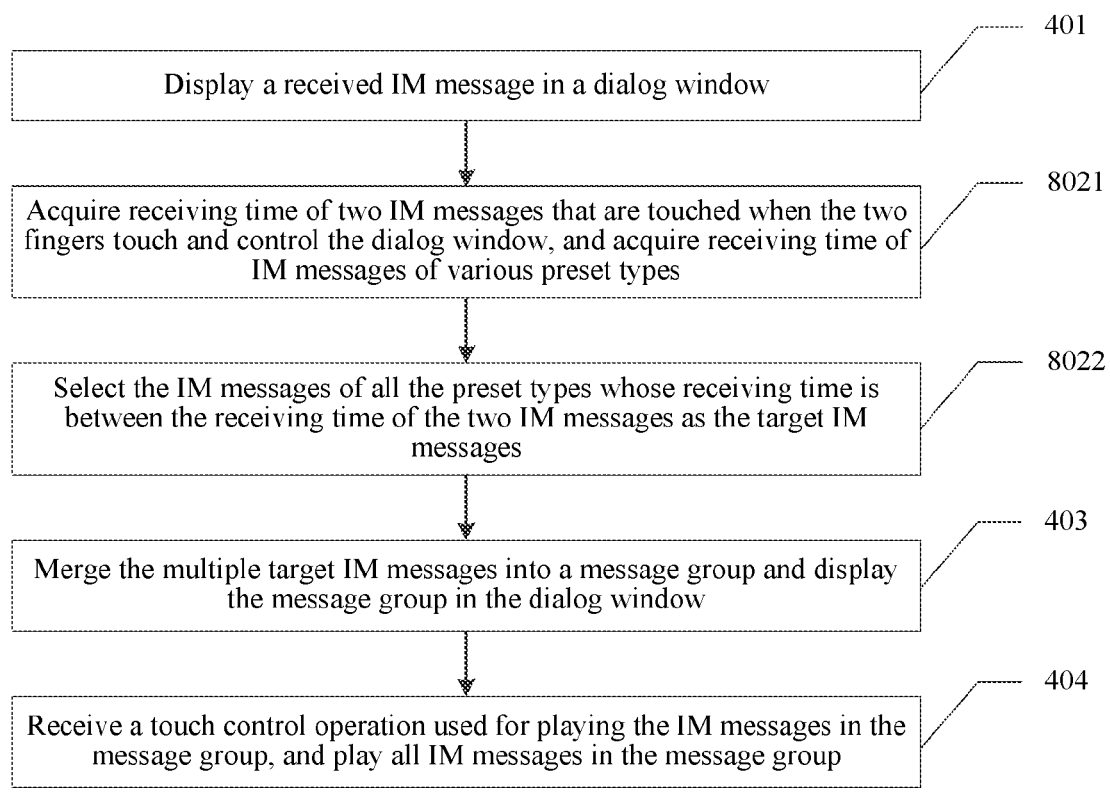
FIG. 8 is a flowchart of a method for playing an IM message provided in an embodiment of the present invention.

Referring to FIG. 8, a method for playing an IM message provided in an embodiment of the present invention may be applied in the terminal device 100 shown in FIG. 2, which is similar to the embodiment shown in FIG. 4, and the differences lie in that the touch control operation is a touch control gesture of a two-finger pinch, and the selecting multiple target IM messages according to an indication of a touch control operation when the touch control operation used for merging IM messages of a preset type is detected in step 402 may further include the following steps.

Step 8021: Acquiring receiving time of two IM messages that are touched when the two fingers touch and control the dialog window, and acquiring receiving time of IM messages of the preset type, when the touch control gesture of the two-finger pinch used for merging IM messages of a preset type is detected.

A user selects and merges the target IM messages by means of the touch control gesture of the two-finger pinch. When two fingers of a user touch the dialog window simultaneously, the two fingers have selected a range of IM messages that are to be merged into a message group, and the gesture of the pinch triggers merging.

IM messages of all preset types whose receiving time is between the receiving time of the two IM messages are selected as the target IM messages.

Step 8022: Selecting the IM messages of the preset type whose receiving time is between the receiving time of the two IM messages as the target IM messages.

For example, when the user merges IM messages by means of a gesture of pinching by using the two fingers. The receiving time of the two IM messages to which the two fingers point is separately 12:31 and 12:40, and IM messages of the preset types as long as whose receiving time is between the two pieces of receiving time is all used as the target IM messages.

Figure 9:
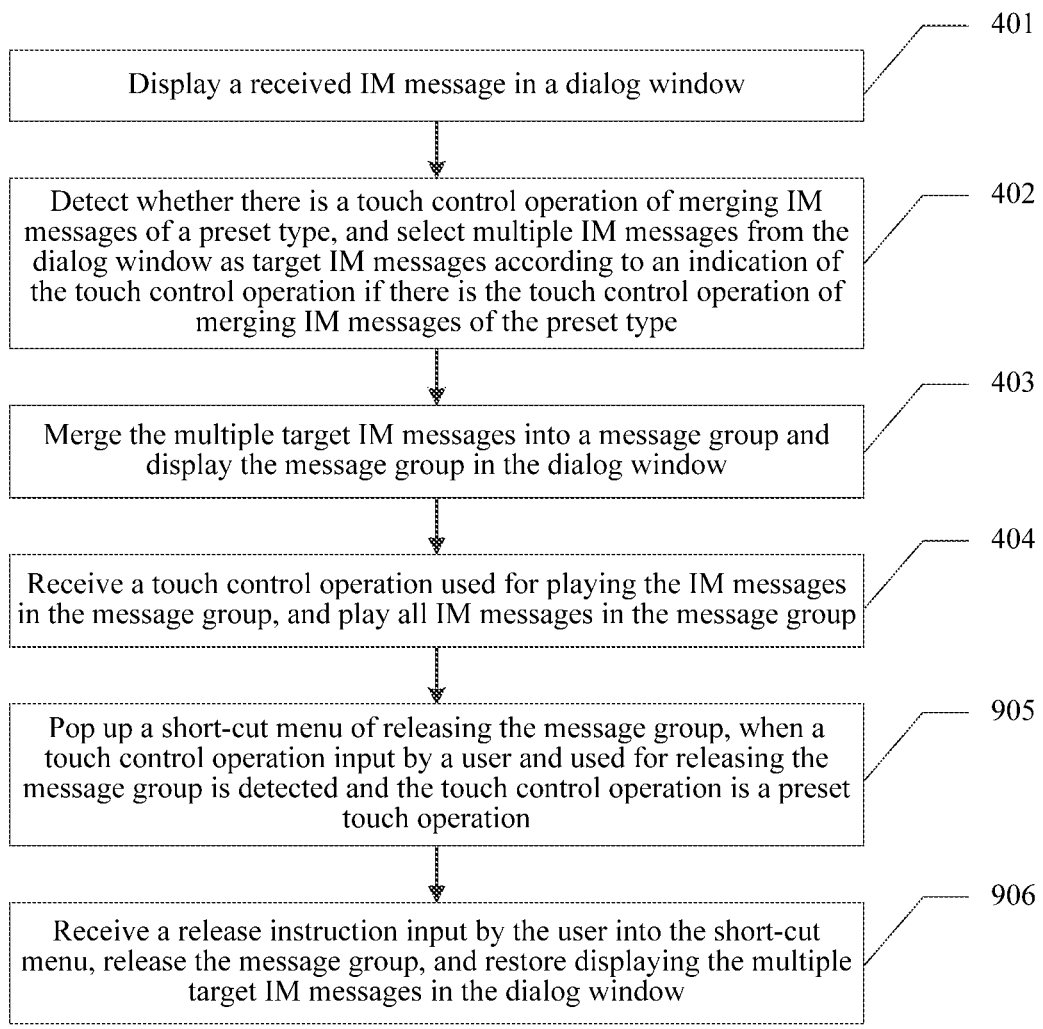
FIG. 9 is a flowchart of a method for playing an IM message provided in an embodiment of the present invention.

Referring to FIG. 9, a method for playing an IM message provided in an embodiment of the present invention may be applied in the terminal device 100 shown in FIG. 2, which is similar to the embodiment shown in FIG. 4, and the difference lies in that the method further includes the following steps.

Step 905: Popping up a short-cut menu of releasing the message group, when a touch control operation input by a user and used for releasing the message group is detected and the touch control operation is a preset touch operation.

The preset touch control operation used for releasing the message group may be a touch and hold operation on the message group. When the touch and hold operation on the message group of the user is detected, the short-cut menu of releasing the message group is popped up. For example, a functional menu may be popped up, and the message group is selected to be released in the functional menu; and a dialog box may also be popped up to query whether to release the message group.

Step 906: Receiving a release instruction input by the user into the short-cut menu, release the message group, and restore displaying the multiple target IM messages in the dialog window.

The instruction for releasing the message group and selected by the user in the functional menu is received, or the instruction for releasing the message group and confirmed by the user is received; the message group is released; and multiple IM messages included in the message group, i.e., the multiple target IM messages, are restored displaying in the dialog window.

Figure 10:
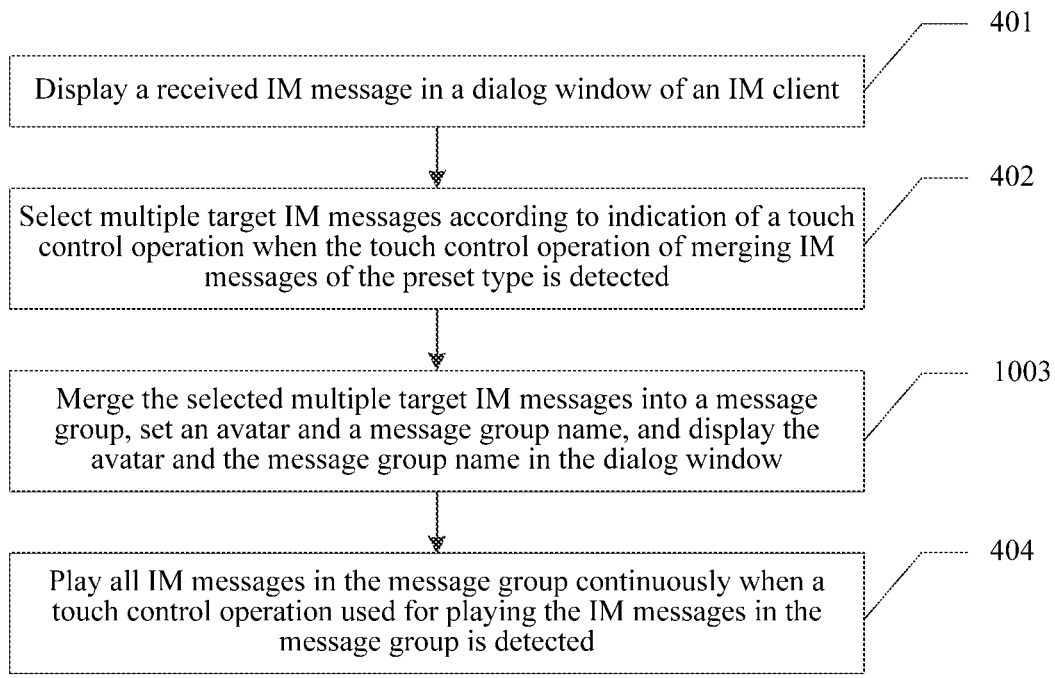
FIG. 10 is a flowchart of a method for playing an IM message provided in an embodiment of the present invention.

Referring to FIG. 10, a method for playing an IM message provided in an embodiment of the present invention may be applied in the terminal device 100 shown in FIG. 2, which is similar to the embodiment shown in FIG. 4, and the difference lies in that the merging the selected multiple target IM messages into a message group and displaying the message group in the dialog window in step 403 further includes the following.

Step 1003: Merging the selected multiple target IM messages into a message group, set an avatar and a message group name, and display the avatar and/or the message group name in the dialog window.

Specifically, an avatar of a target IM message in a preset location is selected from the multiple target IM messages as the avatar of the message group.

For example, an avatar of a target WeChat message in the first location is selected from multiple target WeChat messages as the avatar of the message group. In one embodiment, the multiple target WeChat messages in the message group may be from a same specific user. The avatar of the message group may be the avatar of the specific user. In another embodiment, the multiple target WeChat messages in the message group may be from a plurality of users. The avatar of the message group may be the avatar of a first user, a combination of avatars of the plurality of users, or a combination of avatars of a predetermined number of users among the plurality of users.

Further, a dialog box may be set in a preset location of the dialog window, and an annotation box may be set in a location that is in a preset distance away from the message group. For example, the preset distance may be four characters away from a right side of a display location of the message group (i.e., at the rear of the display location of the message group). Annotation information of the message group input by a user is received and displayed in the annotation box. In some embodiments, an annotation box with default texts may be automatically displayed at the preset horizontal distance away from the message group indicating that it is a message group. The default text may be "message group" or may include the user name, such as "message group from user A."

For example, after the multiple target IM messages are merged into the message group; annotation information "message group" of the message group input by a user is received; and words "message group" are displayed in the annotation box of the message group.

Further, when the multiple target WeChat messages in the message group are from a plurality of users, step 404 may further include: when playing all IM messages in the message group, alternating the displayed avatar of the message group according to whose message is being played. In other words, the displayed avatar of the message group may be the avatar of the user whose message is currently being played.

Figure 11:
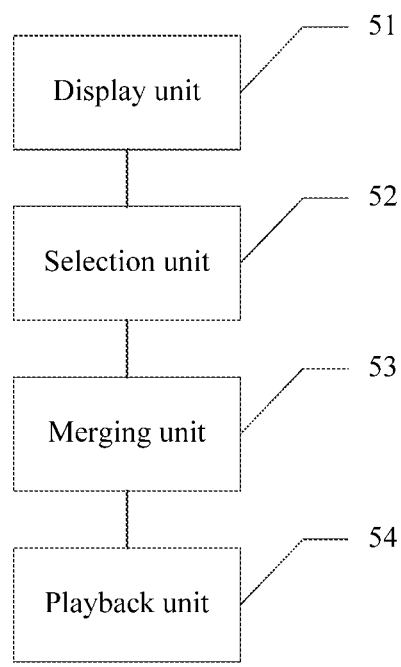
FIG. 11 is a structural diagram of an apparatus for playing an IM message provided in an embodiment of the present invention.

Referring to FIG. 11, an apparatus for playing an IM message provided in an embodiment of the present invention may be applied in the terminal device 100 shown in FIG. 1. The apparatus for playing an IM message in this embodiment includes: a display unit 51, a selection unit 52, a merging unit 53, and a playback unit 54.

The display unit 51 is configured to display a received IM message in a dialog window of an IM client.

The selection unit 52 is configured to select multiple target IM messages according to an indication of a touch control operation when the touch control operation used for merging IM messages of a preset type is detected.

The merging unit 53 is configured to merge the multiple target IM messages selected by the selection unit 52 into a message group.

The display unit 51 is further configured to display the message group merged by the merging unit 53 in the dialog window.

The playback unit 54 is configured to receive a touch control operation used for playing the IM messages in the message group, and play all IM messages in the message group.

For processes of respective units in this embodiment implementing respective functions, reference may be made to the descriptions in the embodiment shown in FIG. 3, which are not described herein again.

Figure 12:
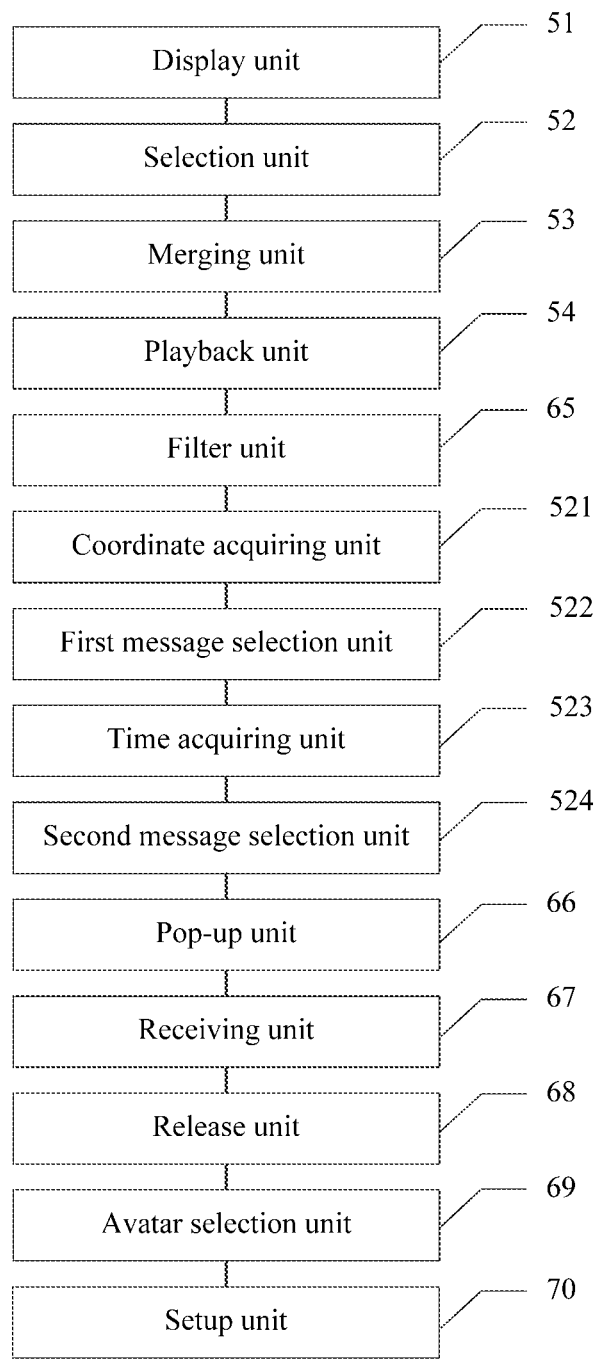
FIG. 12 is a structural diagram of an apparatus for playing an IM message provided in an embodiment of the present invention.

Referring to FIG. 12, an apparatus for playing an IM message provided in an embodiment of the present invention may be applied in the terminal device 100 shown in FIG. 1. The apparatus for playing an IM message in this embodiment is similar to the apparatus shown in FIG. 10, and the differences lie in further including: a filter unit 65, a coordinate acquiring unit 521, a first message selection unit 522, a time acquiring unit 523, a second message selection unit 524, a pop-up unit 66, a receiving unit 67, a release unit 68, an avatar selection unit 69, and a setup unit 70.

The filter unit 65 is configured to filter out IM messages of another type if the multiple target IM messages selected according to the indication of the touch control operation include the IM messages of the another type that do not belong to the IM messages of the preset type.

The IM messages of the preset type include IM voice messages and IM video messages. That is, the IM messages of the preset type include read and unread IM voice messages, and read and unread IM video messages; or the IM messages of the preset type only include the read IM voice messages and the read IM video messages.

The touch control operation is a touch control gesture of a two-finger pinch, and the selection unit 52 includes: the coordinate acquiring unit 521, configured to establish a coordinate system in the dialog window, a horizontal direction being an X axis, and a vertical direction being a Y axis; and acquire coordinate values of two fingers on the coordinate system when the two fingers touch and control the dialog window, and acquire coordinate values of IM messages of various preset types, the coordinate values of the two fingers on the coordinate system comprising coordinate values on the X axis and coordinate values on the Y axis; and the first message selection unit 522, configured to select IM messages of all preset types whose coordinate values on the Y axis are located between the coordinate values on the Y axis of two touch locations as the target IM messages.

Further, the selection unit 52 further includes: the time acquiring unit 523, configured to separately acquire receiving time of two IM messages to which the two fingers point and receiving time of IM messages of various preset types; and the second message selection unit 524, configured to select IM messages of all preset types whose receiving time is between the receiving time of the two IM messages as the target IM messages.

Further, the apparatus for playing an IM message in this embodiment further includes: the pop-up unit 66, configured to pop up a short-cut menu of releasing the message group, when a preset touch control operation input by a user and used for releasing the message group is detected; the receiving unit 67, configured to receive a release instruction of the user; the release unit 68, configured to release the message group; and the display unit 51, configured to restore displaying the multiple target IM messages in the dialog window.

Further, the apparatus for playing an IM message further includes: the avatar selection unit 69, configured to select an avatar of a target IM message in a preset location from the multiple target IM messages as an avatar of the message group, and display the avatar of the message group in the dialog window.

The apparatus for playing an IM message further includes: the setup unit 70, configured to set an annotation box in a preset location of the dialog window; the receiving unit 67, further configured to receive annotation information of the message group input by a user; and the display unit 51, further configured to display the annotation information received by the receiving unit 67 in the annotation box.

For processes of respective units in this embodiment implementing respective functions, reference may be made to the descriptions in the embodiments shown in FIG. 4 to FIG. 9, which are not described herein again.

It should be noted that the relational terms herein such as first and second are used only to differentiate an entity or operation from another entity or operation, and do not require or imply any actual relationship or sequence between these entities or operations. Moreover, the terms "include", "comprise", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Unless otherwise specified, an element limited by "include a/an . . . " does not exclude other same elements existing in the process, the method, the article, or the device that includes the element.

A person skilled in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, and are not intended to limit the present disclosure in any form. Although the present disclosure has been disclosed above through the preferred embodiments, the embodiments are not intended to limit the present disclosure. A person skilled in the art can make some equivalent variations, alterations or modifications to the above-disclosed technical content without departing from the scope of the technical solutions of this application to obtain equivalent embodiments. Any simple alteration, equivalent change or modification made to the above embodiments according to the technical essence of the present disclosure without departing from the content of the technical solutions of this application shall fall within the scope of the technical solutions of the present disclosure.

What is claimed is:

1. A method for playing an instant messaging (IM) message, comprising:
    at a terminal device having one or more processors and memory storing programs executed by the one or more processors:
    displaying a received IM message in a dialog window of an IM client;
    detecting whether there is a touch control operation of merging IM messages of a preset type;
    selecting multiple IM messages from the dialog window as target IM messages according to an indication of the touch control operation if there is the touch control operation of merging IM messages of the preset type;
    merging the multiple target IM messages into a message group;
    displaying the message group in the dialog window;
    receiving a touch control operation used for playing the IM messages in the message group; and
    playing all IM messages in the message group.

2. The method according to claim 1, the IM messages of the preset type comprising:
    IM voice messages and IM video messages.

3. The method according to claim 1, the IM messages of the preset type comprising:
    read IM voice messages and read IM video messages.

4. The method according to claim 1, comprising:
    filtering out IM messages that do not belong to the preset type, if the multiple target IM messages selected according to the indication of the touch control operation comprises the IM messages that do not belong to the preset type.

5. The method according to claim 1, the touch control operation being a touch control gesture of a two-finger pinch, and the selecting multiple IM messages from the dialog window as target IM messages according to an indication of the touch control operation comprising:
    establishing a coordinate system in the dialog window, a horizontal direction being an X axis, and a vertical direction being a Y axis;
    acquiring coordinate values of two fingers on the coordinate system when the two fingers touch and control the dialog window, and acquiring coordinate values of IM messages of the preset type, the coordinate values of the two fingers on the coordinate system comprising coordinate values on the X axis and coordinate values on the Y axis; and
    selecting IM messages of the preset type whose coordinate values on the Y axis are located between the coordinate values on the Y axis of the two fingers as the target IM messages.

6. The method according to claim 1, the touch control operation being a touch control gesture of a two-finger pinch, and the selecting multiple IM messages from the dialog window as target IM messages according to an indication of the touch control operation comprising:
    acquiring receiving time of two IM messages that are touched when the two fingers touch and control the dialog window, and acquiring receiving time of IM messages of the preset type; and selecting IM messages of the preset type whose receiving time is between the receiving time of the two IM messages as the target IM messages.

7. The method according to claim 1, comprising:
popping up a short-cut menu of releasing the message group, when a touch control operation input by a user and used for releasing the message group is detected and the touch control operation is a preset touch operation; and
receiving a release instruction input by the user into the short-cut menu, releasing the message group, and restoring displaying the multiple target IM messages in the dialog window.

8. The method according to claim 1, comprising:
selecting an avatar of a target IM message in a preset location from the multiple target IM messages as an avatar of the message group, and displaying the avatar of the message group in the dialog window.

9. The method according to claim 1, comprising:
setting an annotation box in a preset location of the dialog window; and
receiving annotation information of the message group input by a user, and displaying the annotation information in the annotation box.

10. An apparatus for playing an instant messaging (IM) message, comprising:
one or more processors;
a memory; and
one or more program units stored in the memory and executed by the one or more processors, the one or more program units comprising:
a display unit, configured to display a received IM message in a dialog window of an IM client;
a selection unit, configured to detect whether there is a touch control operation of merging IM messages of a preset type, and select multiple IM messages from the dialog window as target IM messages according to an indication of the touch control operation if there is the touch control operation of merging IM messages of the preset type;
a merging unit, configured to merge the multiple target IM messages into a message group,
the display unit being further configured to display the message group merged by the merging unit in the dialog window; and
a playback unit, configured to receive a touch control operation used for playing the IM messages in the message group, and play all IM messages in the message group.

11. The apparatus according to claim 10, the IM messages of the preset type comprising:
IM voice messages and IM video messages.

12. The apparatus according to claim 10, the IM messages of the preset type comprising:
read IM voice messages and read IM video messages.

13. The apparatus according to claim 10, comprising:
a filter unit, configured to filter out IM messages that do not belong to the preset type, if the multiple target IM messages selected according to the indication of the touch control operation comprises the IM messages that do not belong to the preset type.

14. The apparatus according to claim 10, the touch control operation being a touch control gesture of a two-finger pinch, and the selection unit comprising:

a coordinate acquiring unit, configured to establish a coordinate system in the dialog window, a horizontal direction being an X axis, and a vertical direction being a Y axis;
and acquire coordinate values of two fingers on the coordinate system when the two fingers touch and control the dialog window, and acquire coordinate values of IM messages of the preset type, the coordinate values of the two fingers on the coordinate system comprising coordinate values on the X axis and coordinate values on the Y axis; and
a first message selection unit, configured to select IM messages of the preset type whose coordinate values on the Y axis are located between the coordinate values on the Y axis of the two touch locations as the target IM messages.

15. The apparatus according to claim 10, the touch control operation being a touch control gesture of a two-finger pinch, and the selection unit comprising:
a time acquiring unit, configured to acquire receiving time of two IM messages that are touched when the two fingers touch and control the dialog window, and acquire receiving time of IM messages of the preset type; and
a second message selection unit, configured to select IM messages of the preset type whose receiving time is between the receiving time of the two IM messages as the target IM messages.

16. The apparatus according to claim 10, comprising:
a pop-up unit, configured to pop up a short-cut menu of releasing the message group, when a touch control operation input by a user and used for releasing the message group is detected and the touch control operation is a preset touch operation;
a receiving unit, configured to receive a release instruction input by the user into the short-cut menu; and
a release unit, configured to release the message group,
the display unit being configured to restore displaying the multiple target IM messages in the dialog window.

17. The apparatus according to claim 10, comprising:
an avatar selection unit, configured to select an avatar of a target IM message in a preset location from the multiple target IM messages as an avatar of the message group, and display the avatar of the message group in the dialog window.

18. The apparatus according to claim 10, comprising:
a setup unit, configured to set an annotation box in a preset location of the dialog window,
the receiving unit being further configured to receive annotation information of the message group input by a user; and
the display unit being further configured to display the annotation information received by the receiving unit in the annotation box.

19. A non-transitory computer readable storage medium having stored therein one or more instructions, which, when executed by a terminal device, cause the terminal device to:
display a received instant messaging (IM) message in a dialog window of an IM client;
detect whether there is a touch control operation of merging IM messages of a preset type;
select multiple IM messages from the dialog window as target IM messages according to an indication of the touch control operation if there is the touch control operation of merging IM messages of the preset type;
merge the multiple target IM messages into a message group;
display the message group in the dialog window;

receive a touch control operation used for playing the IM messages in the message group; and
play all IM messages in the message group.

\* \* \* \* \*